(12) United States Patent
Schmidt et al.

(10) Patent No.: US 8,546,845 B2
(45) Date of Patent: Oct. 1, 2013

(54) LIGHT EMITTING DEVICE COMPRISING A GREEN EMITTING SIALON-BASED MATERIAL

(75) Inventors: Peter J. Schmidt, Aachen (DE); Walter Mayr, Alsdorf (DE); Joerg Meyer, Aachen (DE); Juliane Angelika Kechele, Stadtbergen (DE); Wolfgang Schnick, Gauting (DE); Oliver Michael Oeckler, Munich (DE)

(73) Assignee: Koninklijke Philips N.V., Eindhoven (NL)

( * ) Notice: Subject to any disclaimer, the term of this patent is extended or adjusted under 35 U.S.C. 154(b) by 444 days.

(21) Appl. No.: 12/745,701

(22) PCT Filed: Nov. 27, 2008

(86) PCT No.: PCT/IB2008/054994
§ 371 (c)(1),
(2), (4) Date: Jun. 2, 2010

(87) PCT Pub. No.: WO2009/072043
PCT Pub. Date: Jun. 11, 2009

(65) Prior Publication Data
US 2010/0244076 A1    Sep. 30, 2010

(30) Foreign Application Priority Data
Dec. 3, 2007   (EP) .................................. 07122138

(51) Int. Cl.
*H01L 33/00* (2010.01)
*H01J 1/62* (2006.01)
*H01J 63/04* (2006.01)

(52) U.S. Cl.
USPC ............................. 257/103; 313/485; 313/503

(58) Field of Classification Search
None
See application file for complete search history.

(56) References Cited

U.S. PATENT DOCUMENTS

| | | | |
|---|---|---|---|
| 6,555,958 B1 | 4/2003 | Srivastava et al. | |
| 7,061,024 B2 | 6/2006 | Schmidt et al. | |
| 2003/0094893 A1* | 5/2003 | Ellens et al. | 313/503 |
| 2006/0197439 A1 | 9/2006 | Sakane et al. | |
| 2006/0244356 A1 | 11/2006 | Nagatomi et al. | |
| 2007/0034834 A1 | 2/2007 | Liu et al. | |
| 2007/0034885 A1 | 2/2007 | Braune et al. | |
| 2007/0194685 A1* | 8/2007 | Hirosaki | 313/485 |

FOREIGN PATENT DOCUMENTS

| | | |
|---|---|---|
| WO | 2005103199 A1 | 11/2005 |
| WO | 2006072918 A1 | 7/2006 |
| WO | 2006087660 A1 | 8/2006 |
| WO | 2007004138 A2 | 1/2007 |
| WO | 2007066733 A1 | 6/2007 |

OTHER PUBLICATIONS

Liu et al, Fabrication of (Ca+Yb)- and (Ca+Sr)-stabilized a-SiAlON by combustion synthesis, Oct. 2005, Materials Research Bulletin, 41, pp. 547-552.*

* cited by examiner

*Primary Examiner* — Fernando L Toledo
*Assistant Examiner* — Valerie N Newton

(57) ABSTRACT

The invention relates to a light emitting device, especially a LED comprising a green emitting material of the composition $Sr_{5-y-z-a}M_y Si_{23-x} Al_{3+x} O_{x+2a} N_{37-x-2a}:Eu_z:Ce_{z1}$. This material has been found to have a narrow emission in the green wavelight range together with a good producibility and stability.

10 Claims, 3 Drawing Sheets

LIGHT EMITTING DEVICE COMPRISING A GREEN EMITTING SIALON-BASED MATERIAL

FIELD OF THE INVENTION

The present invention is directed to light emitting devices, especially to the field of LEDs.

BACKGROUND OF THE INVENTION

Phosphors comprising silicates, phosphates (for example, apatite) and aluminates as host materials, with transition metals or rare earth metals added as activating materials to the host materials, are widely known. As blue LEDs, in particular, have become practical in recent years, the development of white light sources utilizing such blue LEDs in combination with such phosphor materials is being energetically pursued.

Especially luminescent materials based on the so-called "SiAlON"-system have found the focus of attention in the field due to their good optical features.

However, there is still the continuing need for luminescent materials which are usable within a wide range of applications and especially allow the fabrication of phosphor warm white pcLEDs with optimized luminous efficiency and color rendering.

Especially in the field of green emitting phosphors, several materials have been the subject of investigation.

E.g. in the U.S. Pat. No. 7,061,024 B2, a material of the composition $SrSi_2O_2N_2$:Eu is suggested, which is easy to produce and has a tuneable color point. However, this compound often lacks saturation of the color point and has for some applications a spectrum which is too broad.

A further compound, $(Ba,Sr)_2SiO_4$:Eu was proposed in the U.S. Pat. No. 6,555,958 B1. The advantages here are the good producibility and the tuneability of the color point, too. However, here the spectrum is too broad for many applications and it has been shown that this compound has somewhat a tendency to degenerate in moist air.

SUMMARY OF THE INVENTION

It is an object of the present invention to provide a light emitting device with a material which has improved optical features together with a good producibility and stability This object is solved by a light emitting device according to claim 1 of the present invention. Accordingly, a light emitting device, especially a LED comprising a green emitting material essentially of the composition

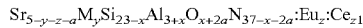

whereby M is selected out of the group comprising Ca, Ba, Mg or mixtures thereof, and x is ≥0 to ≤7, y is ≥0 to ≤5, a is ≥0 to ≤1.5, z is ≥0.0001 to ≤0.5 and z1 is ≥0 to ≤0.5

The term "green emitting" especially means and/or includes that the material shows an emission in the visible range (upon suitable excitation) with a maximum between 500 and 600 nm.

The term "essentially" means especially that ≥95%, preferably ≥97% and most preferred ≥99% of the material has the desired composition.

Such a material has shown for a wide range of applications within the present invention to have at least one of the following advantages:

The stability of the material is usually improved comprising to materials of the prior art. The material has usually a very high thermal, especially photothermal stability.

The spectrum of this material is usually rather sharp, thus allowing the use in many applications within the present invention The spectrum may be "tuned" (as will be described later on).

It should be noted that also Ce(III) may be present in the inventive material. However, since Ce(III) usually incorporates the places of Eu(II)—or other divalent ions, the additional positive charge must be compensated by deviations from the stoichimetry of the pure material. Here several options are available, which all are known to the skilled person in the art 1. cation vacancies
2. changing the O/N ratio in the SiAlON phase
3. changing the Si/Al ratio
4. co-doping with monovalent cations (such as Na)

Deviations of the material according to the changes due to the incorporation of Ce(III) will therefore be noted by the skilled person in the art and also fall under the formulae given above.

According to an embodiment of the present invention, y is ≥0.5 to ≤3. It has been shown that by doing so, a "tuning" of the spectrum is possible for many applications. E.g. substitution of a part of Sr by Ca leads to a red shift of the emission while substitution of a part of Sr by Ba leads to a blue shift of the emission.

In addition, it has been found that in many applications within the present application lowering the alkaline earth cation concentration (increasing factor a) or increasing the (Si,N)→(Al,O) substitution ratio (increasing factor x) leads to a blue shift of the emission band, too, so here a further "tuning" option is possible.

In this context, according to a preferred embodiment a is set to be 0≤a<1.

According to a further preferred embodiment, x is set to be 1≤x<4, more preferred X is set to be 1.5≤x<3

According to a preferred embodiment of the present invention, the green emitting material has a orthorhombic crystal structure. It has been found for many applications within the present invention that by doing so, the properties (especially the emission profile) of the material may be further enhanced.

According to a preferred embodiment of the present invention, in the crystal structure of the green emitting material Eu(II) and/or Ce(III) are positioned in a 6- or 7-fold coordination sphere. Without being bound to any theory, the inventors believe that by setting the material this way, the emission band of the material can be narrowed for many applications.

According to a preferred embodiment of the present invention, the half-width of the emission band in the visible range is ≤90 nm.

According to a further embodiment of the present invention, the material is provided as a ceramic material.

The term "ceramic material" in the sense of the present invention means and/or includes especially a crystalline or polycrystalline compact material or composite material with a controlled amount of pores or which is pore free.

The term "polycrystalline material" in the sense of the present invention means and/or includes especially a material with a volume density larger than 90 percent of the main constituent, consisting of more than 80 percent of single crystal domains, with each domain being larger than 0.5 μm in diameter and may have different crystallographic orientations. The single crystal domains may be connected by amorphous or glassy material or by additional crystalline constituents.

According to a preferred embodiment of the present invention, the photothermal stability of the ceramic material is ≥80% to ≤100% after exposure of the ceramic material for 1000 hrs at 200° C. with a light power density of 10 W/cm$^2$ and an average photon energy of 2.75 eV.

The term "photothermal stability" in the sense of the present invention especially means and/or includes the conservation of the luminescence intensity under simultaneous application of heat and high intensity excitation, i.e. a photothermal stability of 100% indicates that the material is virtually unaffected by the simultaneous irradiation and heat up.

According to a preferred embodiment of the present invention, the photothermal stability of the ceramic material is ≥82.5% to ≤95%, preferably ≥85% to ≤97%, after exposure of the ceramic material for 1000 hrs at 200° C. with a light power density of 10 W/cm$^2$ and an average photon energy of 2.75 eV.

According to a preferred embodiment of the present invention, the thermal conductivity of the ceramic material is ≥0.04 W cm$^{-1}$K$^{-1}$ to ≤0.15 W cm$^{-1}$K$^{-1}$ According to one embodiment of the present invention, the ceramic material shows a transparency for normal incidence in air of ≥10% to ≤85% for light in the wavelength range from ≥550 nm to ≤1000 nm.

Preferably, the transparency for normal incidence is in air of ≥20% to ≤80% for light in the wavelength range from ≥550 nm to ≤1000 nm, more preferred ≥30% to ≤75% and most preferred >40% to <70% for a light in the wavelength range from ≥550 nm to ≤1000 nm.

The term "transparency" in the sense of the present invention means especially that ≥10% preferably ≥20%, more preferred ≥30%, most preferred ≥40% and ≤85% of the incident light of a wavelength, which cannot be absorbed by the material, is transmitted through the sample for normal incidence in air (at an arbitrary angle). This wavelength is preferably in the range of ≥550 nm and ≤1000 nm.

According to a preferred embodiment of the present invention, the ceramic material has a density of ≥95% and <101% of the theoretical density.

According to a preferred embodiment of the present invention, the ceramic material has a density of ≥97% and ≤100% of the theoretical density.

The densities lower than 100% according to the described preferred embodiment of the present invention are preferably obtained by sintering of the ceramic to a stage where still pores are present in the ceramic matrix. Most preferred are densities in the range ≥98.0% and ≤99.8% with total pore volumes in the ceramic matrix within the ≥0.2-≤2% range. A preferred mean pore diameter is in the ≥400-≤1500 nm range.

A light emitting device according to the present invention as well as a ceramic material as produced with the present method may be of use in a broad variety of systems and/or applications, amongst them one or more of the following:
Office lighting systems,
household application systems
shop lighting systems,
home lighting systems,
accent lighting systems,
spot lighting systems,
theater lighting systems,
fiber-optics application systems,
projection systems,
self-lit display systems,
pixelated display systems,
segmented display systems,
warning sign systems,
medical lighting application systems,
indicator sign systems, and
decorative lighting systems
portable systems
automotive applications
green house lighting systems The aforementioned components, as well as the claimed components and the components to be used in accordance with the invention in the described embodiments, are not subject to any special exceptions with respect to their size, shape, material selection and technical concept such that the selection criteria known in the pertinent field can be applied without limitations.

BRIEF DESCRIPTION OF THE DRAWINGS

Additional details, features, characteristics and advantages of the object of the invention are disclosed in the subclaims, the figures and the following description of the respective figures and examples, which—in an exemplary fashion—show several embodiments and examples of a material for use in a light emitting device according to the invention.

DETAILED DESCRIPTION OF EMBODIMENTS

Example I

The invention will be better understood together with the Example I which—in a mere illustrative fashion—is one Example of a inventive green emitting material.

Example I refers to $Sr_{4.9}Al_5Si_{21}O_2N_{35}$:$Eu_{0.1}$ which was made the following way: 16.4 g AlN (98.5%), 35.14 g SrH$_2$ (98.5%), 1.41 g Eu$_2$O$_3$ (99.99%), and 82.3 g SiN$_x$O$_y$ (x=1.66, y=0.02) is mixed under inert atmosphere in a plastic box and fired at 1550° C. for two times with intermediate milling.

The resulting powder is washed with water and dried.

Figure 1:
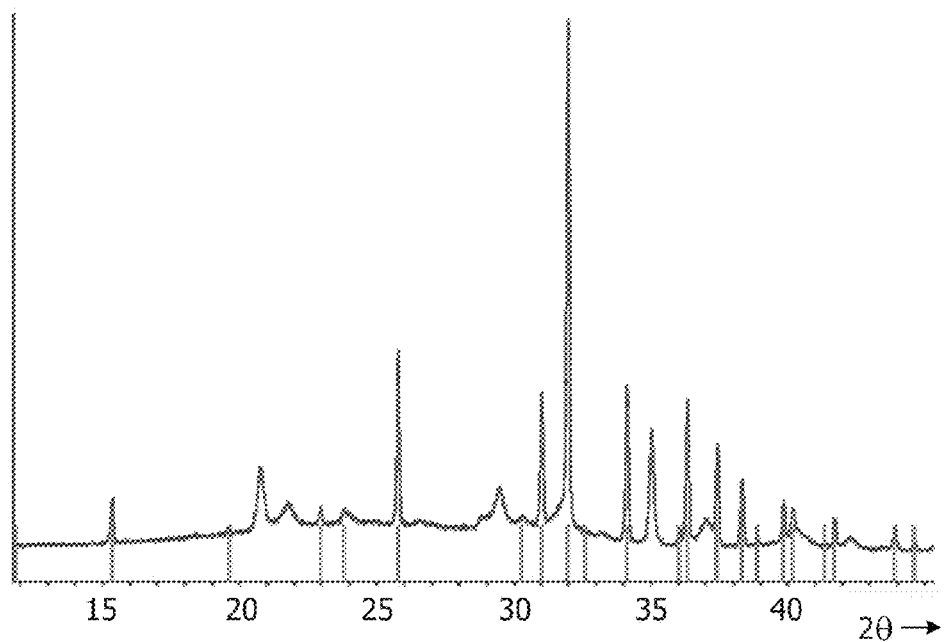
FIG. 1 shows an XRD-pattern for a material according to Example I of the present invention

FIG. 1 shows the XRD pattern of the SiAlON phosphor that comprises sharp and diffuse reflections due to stacking disorder within the crystals. The degree of disorder can be influenced by dwell time and cooling rate of the firing profile. Surprisingly it was found out that a high degree of disorder of the layer stacking has no influence on the efficiency of the luminescent material. The sharp reflections (indicated by red lines) can be indexed with an orthorhombic sub cell with a=7.47 Å, b=9.05 Å, and $c_{sharp}$=2.95 Å. The complete pattern including the diffuse reflections is described with the eight fold elongated cell in c direction ($c_{diff}$=23.61 Å) of the $M_5Si_{23-x}Al_{3+x}O_xN_{37-x}$ structure.

Figure 2:
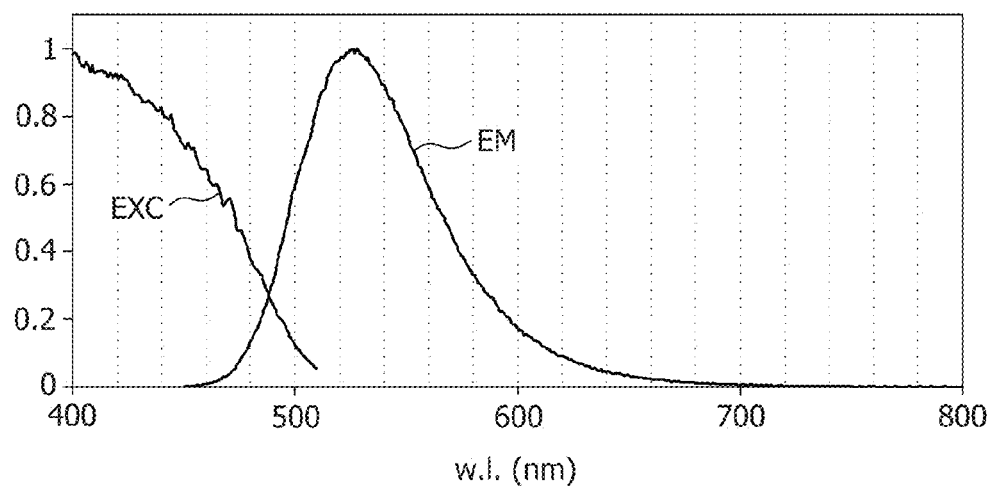
FIG. 2 shows an emission and excitation spectrum of the material according to Example I

FIG. 2 shows the Emission (EM, 450 nm excitation) and excitation (EXC, monitored at 525 nm) spectra of the material of Example I. The CIE color point of the phosphor was found to be: x=0.27, y=0.63. Thus, this material is very useful for green emitting applications alone; however, with further red emitting phosphors, such as e.g. $(Ba,Sr,Ca)_2Si_{5-x}Al_xN_{8-x}O_x$:Eu, $(Sr,Ca,Ba)Al_{1+x}Si_{4-x}N_{7-x}O_x$:Eu or $(Ca,Sr,Mg)Si_{1-x}Al_{1+x}N_{3-x}O_x$:Eu,Ce white light for many application may be provided.

Figure 3:
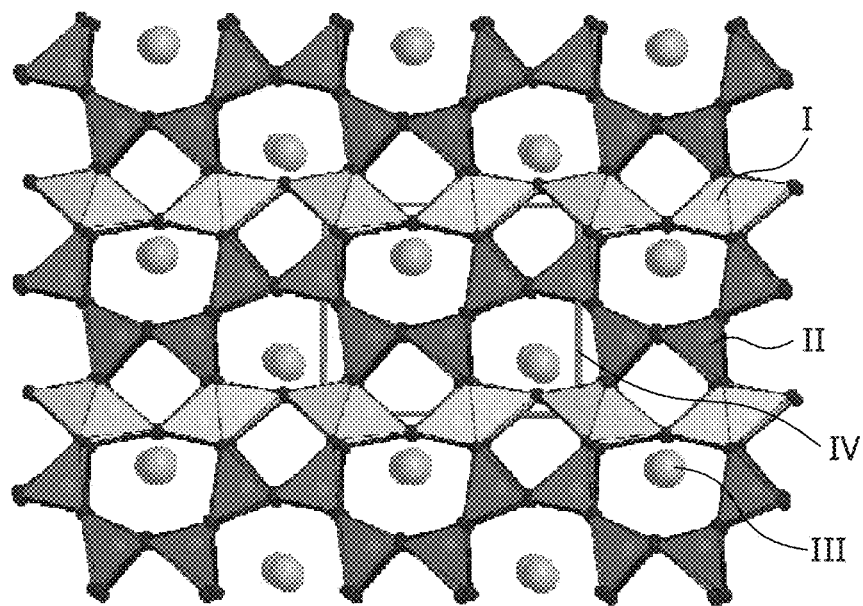
FIG. 3 shows a picture describing a first aspect of the crystal structure of the material of Example I of the present invention.
Figure 4:
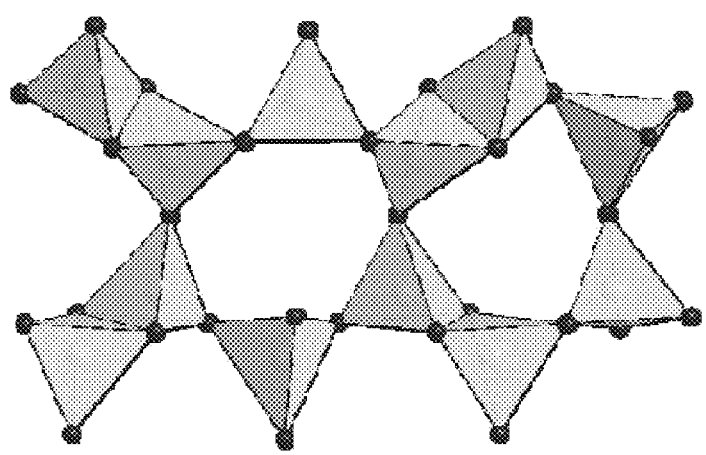
FIG. 4 shows a picture describing a second aspect of the crystal structure of the material of Example I of the present invention.
Figure 5:
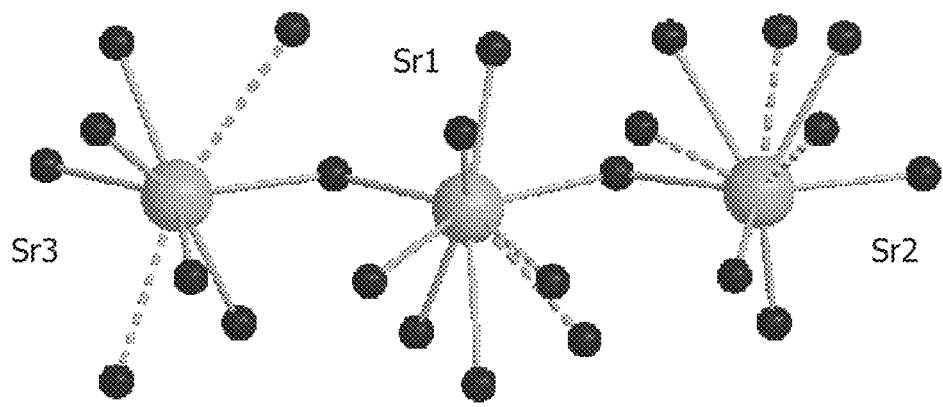
FIG. 5 shows a picture showing the coordination sites of the luminescent ions in the material of Example I

In order to understand the inventive properties of the present invention, the crystal structure of the material of Example I is further explained using FIGS. 3 to 5 which show several detailed views of the determined structure.

As can be seen in FIG. 3, the material crystallizes in a complex structure which is built up of stacks of undulated layers of corner connected $(Si,Al)(O,N)_4$ tetrahedra with Si as the main center cation and more planar layers of corner and edge connected $(Si,Al)(O,N)_4$ tetrahedra with Al as the main center cation. FIG. 2 shows a part of the planar layer of corner and edge connected $(Si,Al)(O,N)_4$ tetrahedra. The edge sharing tetrahedra are preferably occupied by Al atoms, however, also Si atoms can be built in if the charge compensation is properly done by adjusting the N/O ratio.

In the Figure the $Al(N,O)_4$-tetrahedra are marked with Index I, the $Si(N,O)_4$ tetrahedra are marked with Index II. The "Sr-sites" (which are also occupied by Eu) are marked with index III.

The unit cell of the structure is marked by index IV. In one formula unit there exist 30 3-fold connecting anion sites that can only be occupied by N atoms and 7 2-fold connecting anion sites that can be occupied by both N and O.

As can be seen in FIG. 4, the structure comprises a layer of edge and vortex connected tetrahedra. It has been found that usually the edge sharing tetrahedra sites are occupied by Al, although this is no "must".

FIG. 5 shows the coordination of the three crystallographically independent cation sites present in the structure of the material of the present invention (which are marked as Sr1, Sr2 Sr3 although of course Eu will also occupy this sites). All sites show a similar coordination sphere with 6- or 7-fold coordination (contacts shorter than 3 Å) which (although not being bound to this interpretation) could help to explain the rather narrow emission band of the Eu(II) doped phosphor material.

Figure 6:
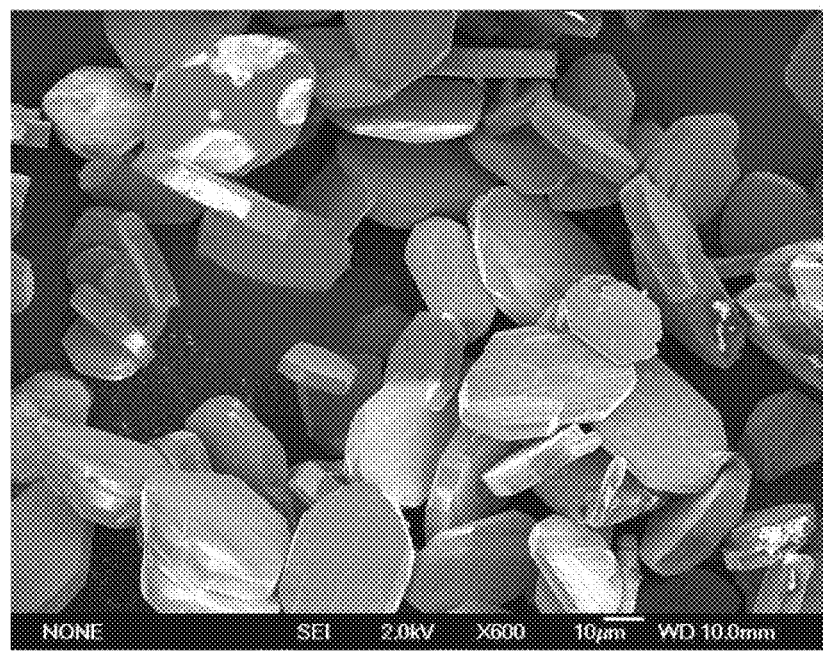
FIG. 6 shows a photograph of the macroscopic structure of the material of example I.

FIG. 6 shows a photograph of the macroscopic structure of the material of example I. Surprisingly, the material grows voluntarily in rather large plate-shaped crystallites.

This feature of the material of Example I is especially of use for the production of ceramics with high optical quality.

The particular combinations of elements and features in the above detailed embodiments are exemplary only; the interchanging and substitution of these teachings with other teachings in this and the patents/applications incorporated by reference are also expressly contemplated. As those skilled in the art will recognize, variations, modifications, and other implementations of what is described herein can occur to those of ordinary skill in the art without departing from the spirit and the scope of the invention as claimed. Accordingly, the foregoing description is by way of example only and is not intended as limiting. The invention's scope is defined in the following claims and the equivalents thereto. Furthermore, reference signs used in the description and claims do not limit the scope of the invention as claimed.

The invention claimed is:

1. Light emitting device, especially a LED comprising a green emitting material essentially of the composition

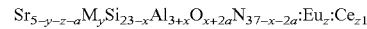

$$Sr_{5-y-z-a}M_ySi_{23-x}Al_{3+x}O_{x+2a}N_{37-x-2a}:Eu_z:Ce_{z1}$$

whereby M is selected out of the group comprising Ca, Ba, Mg or mixtures thereof, and x is ≥0 to ≤7, y is ≥0 to ≤5, a is ≥0 to ≤1.5, z is ≥0.0001 to ≤0.5 and z1 is ≥0 to ≤0.5.

2. The light emitting device of claim 1, whereby y is ≥0.5 to ≤3.

3. The light emitting device of claim 1, whereby a is ≥0 to ≤1.

4. The light emitting device of claim 1, whereby x is ≥1 to ≤4.

5. The light emitting device of claim 1, whereby the green emitting material has a orthorhombic crystal structure.

6. The light emitting device of claim 1 whereby in the crystal structure of the green emitting material Eu (II) and/or Ce (III) are positioned in a 6- or 7-fold coordination sphere.

7. The light emitting device of any claim 1 whereby the half-width of the emission band of the material in the visible range is ≤90 nm.

8. The light emitting device of claim 1 whereby the material is provided as a ceramic material.

9. The light emitting device of claim 1, whereby the photothermal stability of the ceramic material is ≥80% to ≤100% after exposure of the ceramic material for 1000 hrs at 200° C. with a light power density of 10W/cm² and an average photon energy of 2.75 eV.

10. A system comprising a light emitting device according to claim 1, the system being used in one or more of the following applications:
    Office lighting systems
    household application systems
    shop lighting systems,
    home lighting systems,
    accent lighting systems,
    spot lighting systems,
    theater lighting systems,
    fiber-optics application systems,
    projection systems,
    self-lit display systems,
    pixelated display systems,
    segmented display systems,
    warning sign systems,
    medical lighting application systems,
    indicator sign systems, and
    decorative lighting systems
    portable systems
    automotive applications
    green house lighting systems.

* * * * *